United States Patent [19]

Subramanyam

[11] Patent Number: 5,701,471
[45] Date of Patent: Dec. 23, 1997

[54] SYSTEM AND METHOD FOR TESTING MULTIPLE DATABASE MANAGEMENT SYSTEMS

[75] Inventor: Shanti Subramanyam, Saratoga, Calif.

[73] Assignee: Sun Microsystems, Inc., Mountain View, Calif.

[21] Appl. No.: 498,792

[22] Filed: Jul. 5, 1995

[51] Int. Cl.⁶ .................................................. G06F 17/30
[52] U.S. Cl. ........................ 395/616; 395/601; 395/701; 395/704
[58] Field of Search .................................. 395/601, 603, 395/616, 697–19, 701, 704; 364/555, 554, 570, 481, 468, 15, 701, 703

[56] References Cited

U.S. PATENT DOCUMENTS

| | | | |
|---|---|---|---|
| 5,257,366 | 10/1993 | Adair et al. | 395/600 |
| 5,379,422 | 1/1995 | Antoshenkov | 395/600 |
| 5,412,806 | 5/1995 | Du et al. | 395/600 |
| 5,471,629 | 11/1995 | Risch | 395/800 |
| 5,511,190 | 4/1996 | Sharma | 395/600 |
| 5,548,775 | 8/1996 | Hershey | 395/800 |
| 5,561,763 | 10/1996 | Eto | 395/183.11 |
| 5,561,798 | 10/1996 | Haderle et al. | 395/600 |
| 5,566,333 | 10/1996 | Olson | 395/600 |
| 5,604,899 | 2/1997 | Doktor | 395/603 |
| 5,640,555 | 6/1997 | Kleewein et al. | 395/610 |

OTHER PUBLICATIONS

"Performance Analysis of Remote Database Access by Prabhakar Krishbmamurthy"; 7th International Conforernce on Data Engineering: Kobe Japan, IEEE Apr. 8, 1991.

"A Relational Database Processor with Hardware Specialized for Searching and Sorting" by Ushio Inoue et al; IEEE Micro Apr. 1991.

"Benchmarking Multilevel Secure Database Systems Using the Mitre Benchmark" by Vinti Doshi et al.; Mitre Information Systems Security Center, Mitre Corporation, Mclean VA; IEEE Jan. 1994.

*Primary Examiner*—Wayne Amsbury
*Assistant Examiner*—Diane D. Mizrahi
*Attorney, Agent, or Firm*—Gary S. Williams; Flehr Hohbach Test Albritton & Herbert LLP

[57] ABSTRACT

A database management system (DBMS) benchmark testing system for testing performance of a plurality of DBMS's stores both DBMS independent and DBMS specific files in a computer memory. The DBMS specific files include performance statistics collection procedures for each said DBMS, procedures for performing various DBMS operations for each DBMS, and environmental parameter definition files for each DBMS for specifying DBMS environmental parameters that control the configuration and operation of each DBMS. DBMS independent test scripts specify operations to be performed by specified ones of the DBMS's so as to test performance of the DBMS's, and specify performance statistics to be collected by the performance statistics collection procedures while the DBMS performs the specified operations. Test result files store benchmark test results, which include performance statistics for each benchmark test executed by the system under the control of one of the test scripts, as well as information denoting the DBMS tested, the test script used to perform the benchmark test, the operations performed by the DBMS tested, the DBMS environmental parameters for the DBMS tested. DBMS independent post test analysis procedures are used to analyze the information stored in the test result files. The system is modular and extendable, allowing the addition of new benchmark tests and/or the addition of DBMS's that utilize the DBMS independent facilities of the system.

7 Claims, 2 Drawing Sheets

SYSTEM AND METHOD FOR TESTING MULTIPLE DATABASE MANAGEMENT SYSTEMS

The present invention relates generally to systems for testing the performance of database management systems (DBMS), and particularly to a modular benchmarking system that provides a uniform environment for consistently testing the performance of multiple database management systems so as to enable meaningful comparisons of the test results.

BACKGROUND OF THE INVENTION

Database benchmarks are complex. They require the creation of large databases over several disk drives, running a specified workload and capturing relevant statistics. The process is further complicated by the differences between the various (database management system) products.

For instance, the Transaction Processing Council (TPC) benchmarks are standard database benchmarks which are used extensively in the industry. Most DBMS (database management system) vendors that publish TPC results have their own internal benchmarking environment. In fact, prior to the present invention, there has been no product that helps establish an identical environment to run specified benchmark test programs against multiple DBMS's. As a result, despite the clear intent of the TPC to provide a mechanism for fair comparisons of DBMS's, making fair and meaningful comparisons of benchmarks run against different DBMS's is usually impossible because of the use of different benchmarking environments.

Another problem with essentially all prior DBMS benchmarking systems has been the lack of embedded system, software and test configuration data in DBMS benchmark test results. As a result, test engineers are often unable to reconstruct the exact system and DBMS configuration and test parameters corresponding to a particular set of DBMS benchmark results, especially when dozens or hundreds of benchmark tests have been run and days, weeks or months have passed since those tests were completed.

Yet another problem addressed by the present invention is the amount of work required to build new DBMS benchmark tests. To construct a benchmark test for testing the performance of a DBMS, in addition to preparing the basic benchmark test procedure itself, the software engineer typically needs to write pre-test procedures for constructing a database against which to run the benchmark, procedures for controlling the environment, procedures for collecting performance statistics, and post test procedures for analyzing and presenting the results of the benchmark tests. As a result, preparing a complete benchmark test for a DBMS is a much more complex undertaking than simply determining how the benchmark test will exercise the DBMS and writing a corresponding procedure.

It is therefore an object of the present invention to provide a DBMS benchmark testing system and method that provides a uniform environment for testing multiple DBMS's with any specified benchmark test so as to produce test results that can be meaningfully compared with one another.

Another object of the present invention is to provide a DBMS benchmark testing system and method that is modular and extendable such that new benchmark tests can be added to the system, and such that the database building tools, statistics collection tools and post test reporting tools provided by the system can be used for such new tests, thereby substantially reducing the amount of engineering effort required to design new benchmark tests.

Another object of the present invention is to provide a DBMS benchmark testing system and method that is modular and extendable such that new DBMS's can be added to the system by adding corresponding statistics collection tools and other tools for each new DBMS. The modularity of the DBMS benchmark testing system and method reduces the amount of engineering effort required to add new DBMS's to the system, because all the high level test control procedures, as well as the post test tools of the system are applicable to added DBMS's as well as to previously established DBMS's.

SUMMARY OF THE INVENTION

In summary, the present invention is a database management system (DBMS) benchmark testing system for testing performance of a plurality of DBMS's. The system stores both DBMS independent and DBMS specific files in a computer memory. The DBMS specific files include performance statistics collection procedures for each said DBMS, task performance procedures for each the DBMS for executing checkpoints and other DBMS operations, and environmental parameter definition files for each DBMS for specifying DBMS environmental parameters that control the configuration and operation of each DBMS.

DBMS independent test scripts specify operations to be performed by specified ones of the DBMS's so as to test performance of the BBMS's, and specify performance statistics to be collected by the performance statistics collection procedures while the DBMS performs the specified operations. Test result files store benchmark test results, which include performance statistics for each benchmark test executed by the system under the control of one of the test scripts, as well as information denoting the DBMS tested, the test script used to perform the benchmark test, the operations performed by the DBMS tested, and the DBMS environmental parameters for the DBMS tested. DBMS independent post test analysis procedures are used to analyze the information stored in the test result files. As a result, the files used to store benchmark test results are self-documenting with respect to the system configuration and database configuration on which the benchmark tests were run and with respect to the operations performed by the DBMS's during the execution of the benchmark tests.

Another feature of the present invention is that multiple users of the system can independently set up benchmark tests, using different system parameters, different DBMS parameters and different test parameters from one another, without affecting each other's benchmark tests. All parameter selections by each user are stored in distinct, respective test parameter files. Thus, the selection of parameters used to control the execution of each benchmark test is durably stored in parameter files so as to enable the definition of many distinct benchmark test iterations.

The system is modular and extendable, allowing the addition of new benchmark tests and/or the addition of DBMS's that utilize the DBMS independent facilities of the system. The modular design of the present invention also allows the addition of new performance monitoring tools (i.e., new performance statistics collection tools and/or new post test evaluation tools) without modification of any other parts of the system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
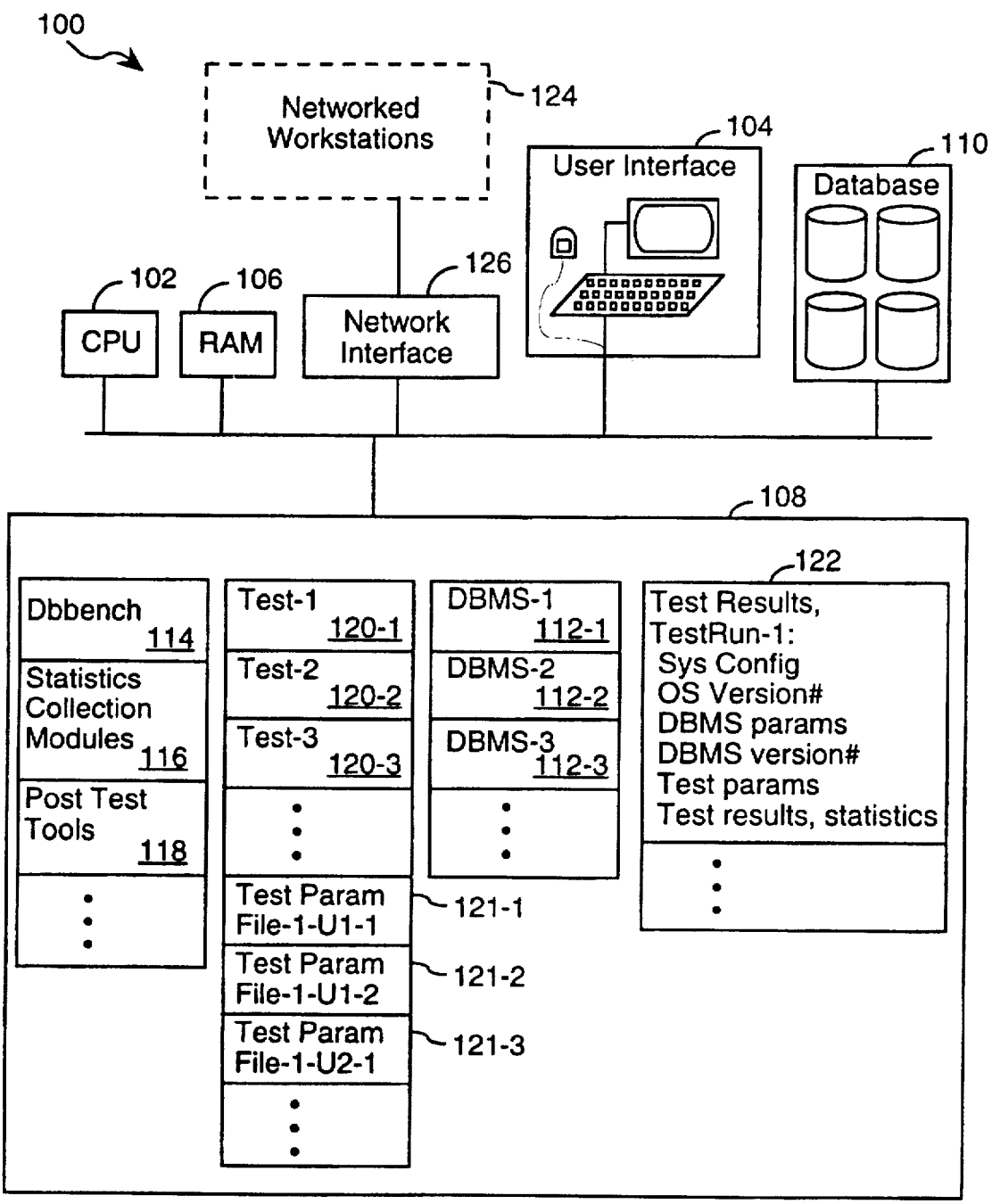
FIG. 1 is a block diagram of a database management system (DBMS) benchmark testing system.

Referring to FIG. 1, there is shown a DBMS benchmarking system 100 that incorporates the methodologies of the present invention. The system 100 includes a central processing unit 102, a user interface 104, random access memory 106, and secondary memory 108 (e.g., disk storage). In addition, the system will typically include database storage 110, which generally includes additional hard disk storage devices for the storage of database tables and files used in the process of benchmark testing.

Secondary memory 108 stores the software and data files associated with the DBMS's to be tested and the benchmark test facilities of the present invention. In the preferred embodiment, the system incorporates several distinct DBMS's 112, herein labelled DBMS-1, DBMS-2, DBMS-3. The top level of the user interface associated with the DBMS benchmark testing environment is provided by a software module called Dbbench 114.

The system includes a set of performance statistics collection modules 116, which collect statistical information from the system and the DBMS's while they are performing a set of tasks. In the preferred embodiment there are three levels of performance statistics collection procedures: system level, DBMS level, and test level procedures. The system level procedures for collecting performance statistics collect information such as: number of system calls made; CPU usage including amount of time the system spent in user mode and kernel mode; number of context switches made; network statistics such as number of packets sent and received per second and the packet collision rate; and I/O statistics such as, for each disk used in the benchmark test, average disk access time, number of disk accesses per second, and the average size of the data blocks accessed.

Procedures for collecting DBMS level performance statistics collect statistics on matters such as the numbers of transactions aborted and completed, cache hit rates and contention for latches. Procedures for collecting test specific performance statistics collect specialized performance statistics, such as number of queries successfully handled and response rates when various different levels of queries were used, and other performance statistics associated with various phases of the tests performed.

Typically, there is a separate performance statistics collection procedure, or set of procedures, for each distinct DBMS 112, unless two of the DBMS's are simply different versions or release levels of the same basic DBMS and are so similar that the same performance statistics procedures can be used with both DBMS's.

A set of DBMS independent post test tolls (i.e., procedures) 118, is provided for analyzing, viewing and printing benchmark test results. Since some of the benchmark test procedures test significantly different performance characteristics of DBMS's than others, some of the post test analysis procedures 118 are specific to respective ones of the benchmark tests 120.

The benchmark tests 120 are DBMS independent scripts that are interpreted and executed by the Dbbench program 114. Most, although not all, test scripts 120 are used for testing multiple ones of the DBMS's 112.

Each test script 120 has an associated test parameter file 121 that specifies parameters that govern the number of times various operations are performed, parameters that govern various characteristics of the operations performed, as well as test related environmental characteristics such as the number of user processes which will access the DBMS under test and perform the specified operations during the benchmark test. More specifically, for each distinct test script 120 there is a corresponding test parameter template file that defines the data structure of the test parameter files 121, while each instance of the test parameter file is used to govern the execution of the script file so as to perform a particular benchmark test. Thus numerous test parameter files may be defined for a given test script, but only one such test parameter file will be used for each execution of the benchmark test.

In most instances, one of the parameters in each test parameter file is a parameter that specifies the DBMS to be tested. Other parameters typically included in a test parameter file indicate the size and structure of the tables in the data base to be used by the DBMS under test, subtests to be performed and skipped, rates at which transaction requests are generated and sent to the DBMS under test, test duration, and the number of times various operations are to be repeated.

The execution of a test script 120 against a specified one of the DBMS's 112 results in the generation of a test results file 122. Test result files 122 are generated by the Dbbench program 114 so that the test results are self-documenting with respect to the system configuration and database configuration on which the benchmark tests were run and with respect to the operations performed by the DBMS's during the execution of the benchmark tests. More particularly, each test result file 122 stores benchmark test results, which include performance statistics (i.e., system level, DBMS level and test level statistics) for the benchmark test executed by the system under the control of one of the test scripts and a respective one of the test parameter files, as well as information denoting the DBMS tested, the test script used to perform the benchmark test, the operations performed by the DBMS tested, and the DBMS environmental parameters for the DBMS tested.

The post test procedures 118 do more than simply present a visual representation of the test results stored in the test result files 122. In particular, some of the post test procedures 118 analyze the test results so as to identify problems and potential problems and present the results of that analysis to the user. For instance, if benchmark test is run against a DBMS with a large database having, say, 50 disk storage devices, and the test results include disk performance statistics for each of the 50 disks, the post test procedures 118 include an I/O analysis procedure that analyzes the disk performance statistics and bring to the user's attention any problems identified by the I/O analysis procedure. "Manual" identification of such problems by visual inspection of performance data for 50 disks is difficult and error prone. The post test procedures facilitate the review of test results by identifying performance statistics that are outside their respective normally accepted ranges.

Another feature of the present invention is that multiple users of the system can independently set up benchmark tests, using different system parameters, different DBMS parameters and different test parameters from one another, without affecting each other's benchmark tests. In the preferred embodiment, these users work at various workstations 124 that communicate with the DBMS benchmark testing system 100 via a standard network interface 126.

All parameter selections by each user are stored in distinct, respective test parameter files 121. In the preferred embodiment, a suffix is added to the parameter file names, where the suffix is unique for each distinct user of the system. Further, each user can define a virtually unlimited number of distinct parameter files for each defined benchmark test so as to test the DBMS's under a variety of test conditions, and each of the resulting test parameter files 121 is assigned a unique file name. Thus, the selection of parameters used to control the execution of each benchmark test is durably stored in parameter files so as to enable the definition of many distinct benchmark test iterations.

Furthermore, multiple users can use the Dbbench facility simultaneously, since each user is independently defining distinct test parameter files. When multiple users request the execution of specified benchmark tests (i.e., request the execution of a specified test script with a specified test parameter file), all the requested benchmark tests are queued and then run sequentially, on at a time, under the control of a scheduler that is incorporated in the Dbbench facility.

Figure 2:
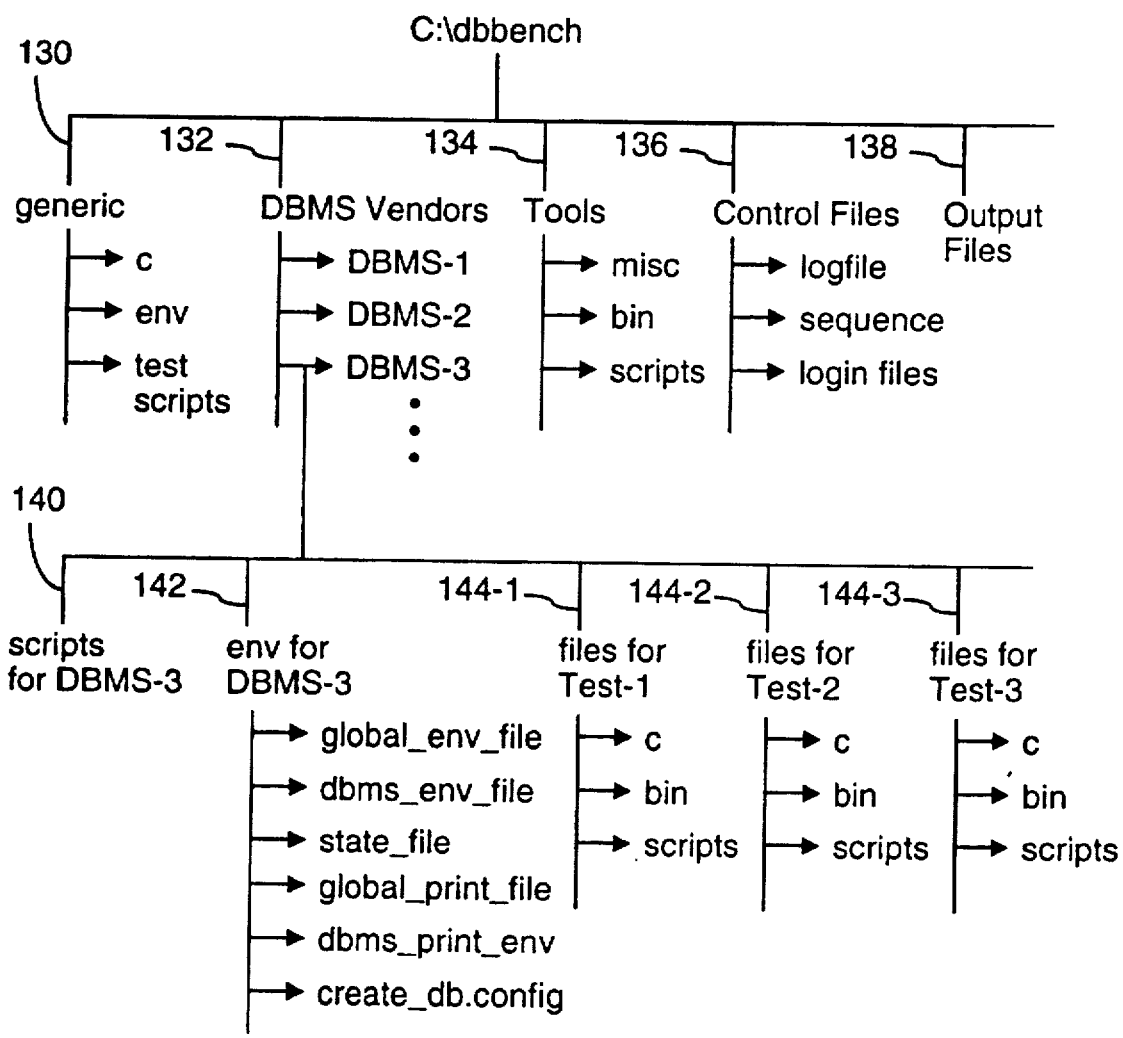
FIG. 2 depicts the directory structure used in a preferred embodiment to store test scripts, procedures and parameters files associated with the DBMS benchmark tests executed by the system shown in FIG. 1.

Referring to FIG. 2, there is shown the directory structure used in a preferred embodiment to store test scripts, procedures and parameters files associated with the DBMS benchmark tests executed by the system shown in FIG. 1. The top level directories include a "generic" directory 130 that contains the main procedures for Dbbench, as well as the top level (i.e., DBMS independent) test scripts 120, the test parameter template files and the test parameter files 121 defined by users of the system when setting up benchmark tests to be executed. The top level directories also include a DBMS Vendors directory 132 that contains subdirectories of files for each DBMS, a Tools directory 134 that contains the procedures for collecting system level performance statistics as well as post test procedures for analyzing benchmark test results, a Control Files directory 136 that contains procedures and data files for controlling access to the benchmark testing system, and an Output files directory 138 for storing test result files.

Within each DBMS Vendors directory 132, there are several subdirectories. A scripts subdirectory 140 contains DBMS specific scripts, which are called by the top level DBMS independent test scripts 120. These scripts are used to convert top level operational commands, such as "clear internal status table," "collect DBMS specific statistics," or "do checkpoint" into a command or sequence of commands specific for a particular DBMS. The DBMS scripts directory 120 is also used to store DBMS specific (but test independent) performance statistics collection procedures.

A DBMS environment subdirectory 142 stores test independent parameter files that govern the configuration of the DBMS corresponding to this subdirectory, and also govern the structure of databases generated for the purpose of testing that DBMS.

Test specific subdirectories 144-1, 144-2, ..., contain scripts and procedures specific to respective ones of the benchmark tests. For instance, these procedures generate database queries, transaction requests, and other DBMS commands in particular sequences and combinations. The test specific subdirectories 144 may also store test specific performance statistics collection procedures.

As explained above, there are three levels of performance statistics collection procedures 116: A) procedures for collecting system level performance statistics, such as those concerning CPU usage; B) procedures for collecting DBMS level performance statistics, such as statistics concerning cache hit rates and numbers of transactions aborted and completed; and C) procedures for collecting test specific performance statistics. The system level performance statistic collection procedures are stored in the Tools directory 134. The DBMS level performance statistics collection procedures are stored in the scripts subdirectories 140 of the respective DBMS directories 132. The test specific performance statistics collection procedures are stored in the test subdirectories 144 for each of the DBMS's.

Adding a new benchmark test to the system is achieved as follows. The new top level, DBMS independent, test script 120 is prepared by a software engineer and is stored in the generic directory 130. A parameter template file for the new test script must also be prepared and stored in the generic directory 130. A new test subdirectory 144 within the parent directory for each DBMS is created, and a set of scripts and procedures for performing the tasks associated with the new benchmark test (under the control of parameters passes to those procedures by the top level test script) must be added to those test specific subdirectories 144. If the new benchmark test requires different performance statistics to be collected than the previously defined benchmark tests, a new performance statistics collection procedure would be added to the test specific subdirectories 144 for each of the DBMS's in the system.

The benchmark test control procedures, test result storage procedures and post test procedures associated with the main Dbbench program remain unchanged when a new benchmark test is added to the system. Also remaining unchanged are the system level and DBMS level performance statistics collection procedures.

Adding a new DBMS to the system 100 is achieved as follows. In addition to installing the new DBMS itself, all the files shown in FIG. 2 for directories 140, 142 and 144 (which are discussed above) must be added. What remains unchanged when a new DBMS is added to the system are: the benchmark test control procedures, test result storage procedures and post test procedures associated with the main Dbbench program as well as the top level benchmark test scripts.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A database management system (DBMS) benchmark testing system for testing performance of a plurality of DBMS's, comprising:

computer memory for storing said plurality of DBMS's;

DBMS specific files stored in said computer memory, said DBMS specific files including: performance statistics collection procedures for each said DBMS, task performance procedures for each said DBMS for executing database query operations and other DBMS operations, and environmental parameter definition files for each DBMS for specifying DBMS environmental parameters that control the configuration and operation of said each DBMS;

DBMS independent test scripts stored in said computer memory, each test script specifying operations to be performed by specified ones of said DBMS's so as to test performance of said ones of said DBMS's, and specifying performance statistics to be collected by said performance statistics collection procedures while said DBMS performs said specified operations;

test result files, stored in said computer memory, for storing benchmark test results, said benchmark test results including said specified performance statistics for each benchmark test executed by said system under the control of one of said test scripts, as well as information denoting the DBMS tested, the test script used to perform the benchmark test and the operations performed by the DBMS tested, and said DBMS environmental parameters for the DBMS tested; and DBMS independent post test analysis procedures, stored in said computer memory, for analyzing the information stored in said test result files.

2. The database management system (DBMS) benchmark testing system of claim 1, wherein at least a plurality of said DBMS independent test scripts are each executable against a plurality of said DBMS's; and said test result files include benchmark test results resulting from execution of a single one of said DBMS independent test scripts against a plurality of said DBMS's.

3. The database management system (DBMS) benchmark testing system of claim 2, said DBMS independent post test analysis procedures including procedures for comparing the information stored in said test result files resulting from said execution of said one DBMS independent test script against said plurality of said DBMS's.

4. A method of benchmark testing database management systems (DBMS's), comprising the steps of:

storing in a computer memory DBMS specific files, including: performance statistics collection procedures for each said DBMS, task performance procedures for each said DBMS for executing database query operations and other DBMS operations, and environmental parameter definition files for each DBMS for specifying DBMS environmental parameters that control the configuration and operation of said each DBMS;

storing in said computer memory DBMS independent test scripts, each test script specifying operations to be performed by specified ones of said DBMS's so as to test performance of said ones of said DBMS's, and specifying performance statistics to be collected by said performance statistics collection procedures while said DBMS performs said specified operations;

executing user selected ones of said DBMS independent test scripts against user selected ones of said DBMS's and storing resulting benchmark test results in test result files, said benchmark test results including said specified performance statistics for each benchmark test executed by said system under the control of one of said test scripts, as well as information denoting the DBMS's tested, the test script used to perform the benchmark test and the operations performed by the DBMS tested, and said DBMS environmental parameters for the DBMS's tested; and executing DBMS independent post test analysis procedures for analyzing the information stored in said test result files.

5. The method of claim 4, wherein at least a plurality of said DBMS independent test scripts are each executable against a plurality of said DBMS's; said test script executing step including executing a single one of said DBMS independent test scripts against a plurality of said DBMS's and storing the resulting benchmark test results in said test result files.

6. The method of claim 4, further including:

adding a new test script to said system by storing in said computer memory:

a new DBMS independent test script; and a test parameter template file corresponding to said new test script, said test parameter template file denoting test parameters to be specified prior to execution performance of said new test script.

7. The method of claim 4, further including:

adding a new test script to said system by storing in said computer memory:

a new DBMS independent test script;

a test parameter template file corresponding to said new test script, said test parameter template file denoting test parameters to be specified prior to execution performance of said new test script;

DBMS specific task performance procedures for each said DBMS for executing any operations required by said new test script but not supported by said DBMS specific procedures previously stored in said computer memory; and DBMS independent post test analysis procedures for performing any test result analyses associated with said new test script but not supported by said DBMS post test analysis procedures previously stored in said computer memory.

\* \* \* \* \*